United States Patent [19]

Yokote et al.

[11] Patent Number: 5,012,881
[45] Date of Patent: May 7, 1991

[54] VEHICLE STEERING SYSTEM WITH FLOW DIVIDING VALVE

[75] Inventors: Masatsugu Yokote; Fukashi Sugasawa, both of Yokohama; Hiroshi Mouri, Yokosuka; Junsuke Kuroki, Yokohama, all of Japan

[73] Assignee: Nissan Motor Co., Ltd., Yokohama, Japan

[21] Appl. No.: 379,790

[22] Filed: Jul. 17, 1989

[30] Foreign Application Priority Data

Jul. 20, 1988 [JP] Japan ................. 63-178951

[51] Int. Cl.$^5$ ................. B62D 5/09
[52] U.S. Cl. ................. 180/140; 180/141
[58] Field of Search ................. 180/140, 141, 143

[56] References Cited

U.S. PATENT DOCUMENTS

| | | | |
|---|---|---|---|
| 4,579,186 | 4/1986 | Uno et al. | 180/140 |
| 4,601,358 | 7/1986 | Kozuk et al. | 180/143 X |
| 4,666,013 | 5/1987 | Shibahata et al. | 180/141 |
| 4,679,809 | 7/1987 | Ito et al. | 280/91 |
| 4,705,131 | 11/1987 | Shibahata et al. | 180/140 |
| 4,740,002 | 4/1988 | Miyoshi | 280/91 |

FOREIGN PATENT DOCUMENTS 61-193967 8/1986 Japan .

*Primary Examiner*—Charles A. Marmor
*Assistant Examiner*—Mitchell Bompey
*Attorney, Agent, or Firm*—Foley & Lardner

[57] ABSTRACT

A vehicle steering system includes a front hydraulic actuator for steering front wheels, a rear hydraulic actuator for steering rear wheels, a front control valve of an open center type for controlling the fluid pressure of the front actuator, a rear control valve of the open center type for controlling the fluid pressure of the rear actuator, a common fluid pressure source, and a flow dividing valve for dividing a fluid flow from the common pressure source into two flows directed to the front and rear control valves so that the front and rear control valves of the open center type can control the fluid pressures independently and accurately.

9 Claims, 1 Drawing Sheet

VEHICLE STEERING SYSTEM WITH FLOW DIVIDING VALVE

BACKGROUND OF THE INVENTION

The present invention relates to a four wheel steering system for steering front wheels and rear wheels, and more specifically to a steering system having two hydraulic actuators for steering the front wheels and the rear wheels, respectively.

Various four wheel steering systems are shown in patent documents. Some examples are U.S. Pat. Nos. 4,666,013; 4,705,131 and 4,679,809, and commonly assigned, copending United States patent applications Ser. Nos. 07/195,085 (filed on May 17, 1988), 07/269,698 (filed on Nov. 10, 1988), 07/305,023 (filed on Feb. 2, 1989), and 07/314,874 (filed on Feb. 24, 1989).

A four wheel steering system of the abovementioned U.S. Pat. No. 4,666,013 has a front wheel auxiliary steering system and a rear wheel auxiliary steering system which are both of a hydraulic type. Both of the front and rear wheel auxiliary steering systems receive hydraulic fluid pressure from a common fluid pressure source, and each system has a servo valve, and a steer angle sensor for feedback control.

This four wheel steering system of such a closed center type is superior in control accuracy, but disadvantageous in delay of response due to the feedback control, and in the manufacturing cost raised by the servo valves which are expensive, and the addition of the sensors for sensing the auxiliary steer angles.

Therefore, some four wheel steering systems utilize two separate fluid pressure sources, and pressure control valves which are not the servo type. However, this arrangement requires two oil pumps, and therefore, increases the cost, and the size of the system.

SUMMARY OF THE INVENTION

It is therefore an object of the present invention to provide a four wheel steering system which can improve the response characteristic and o reduce the manufacturing cost, by employing a single common pressure source, and a non-servo type pressure control valves.

According to the present invention, a steering system for a vehicle, such as an automobile or some other motor vehicle, comprises a front hydraulic actuator for varying a front wheel steer angle of the vehicle, a rear hydraulic actuator for varying a rear wheel steer angle of the vehicle, a controlling means for controlling the front and rear wheel steer angles by producing front and rear control signals, a front hydraulic circuit comprising a front control valve for varying a fluid pressure supplied to the front actuator in accordance with the front control signal of the controller means, and a rear hydraulic circuit comprising a rear control valve for varying a fluid pressure supplied to the rear actuator in accordance with the rear control signal of the controller means. The steering system of the invention further comprises a common fluid pressure source, and a flow dividing valve which has an input port connected with the common fluid pressure source for receiving an incoming fluid flow from the common fluid pressure source, a first output port connected with the front hydraulic circuit for delivering a first outgoing fluid flow to the front control valve, and a second output port connected with the rear hydraulic circuit for delivering a second outgoing fluid flow to the rear control valve.

The flow driving valve can prevent a pressure variation in one of the front and rear hydraulic circuits from exerting influence on the pressure of the other circuit. Therefore, the steering system of the present invention enables an accurate steer angle control by using an open center system without using a servo type steer angle control valve.

The front hydraulic actuator may be arranged to steer front wheels of the vehicle solely or in cooperation with a steering gear.

It is preferable to arrange the flow dividing valve so that a ratio of a flow rate directed to the front actuator to a flow rate directed to the rear actuator is equal to a ratio of a required maximum speed of the front actuator to a required maximum speed of the rear actuator. In this case, the control accuracy is maintained in both of the front and rear wheel steering systems even in the most severe steering conditions. The required maximum speeds of the front and rear actuators are determined experimentally or empirically.

DETAILED DESCRIPTION OF THE INVENTION

Figure 1:
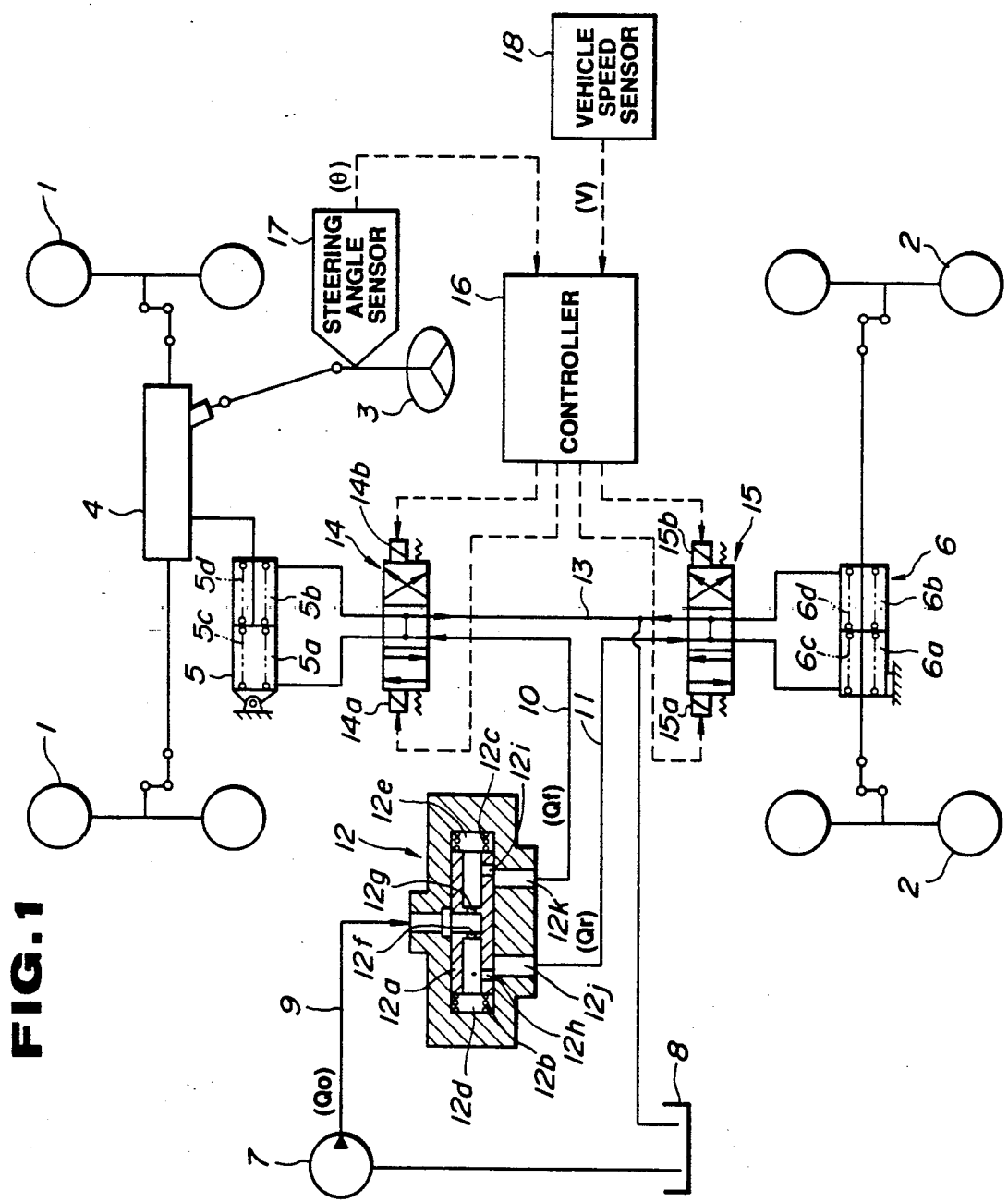
FIG. 1 is a schematic view of a vehicle equipped with a steering system according to one embodiment of the present invention.

FIG. 1 shows a vehicle, such as a motor vehicle, having a steering system according to one embodiment of the present invention.

The vehicle shown in FIG. 1 has left and right front wheels 1, and left and right rear wheels 2.

The front wheels 1 are connected with a steering wheel 3 through a steering gear 4 so that the front wheels 1 are steerable in a conventional manner. There is further provided a front wheel steering hydraulic actuator 5 which can steer the front wheels 1 by moving a housing of the steering gear 4. (One example of the combination of the steering gear and the hydraulic actuator is shown in FIG. 8 of the above-mentioned U.S. Pat. No. 4,666,013. FIG. 8 and a related explanation of this document is herein incorporated by reference.) Therefore, the front wheels 1 are steered primarily by the steering gear 4 in the conventional manner, and secondarily steered by the hydralic actuator 5. The actual front wheel steer angle is equal to an algebraic sum of a primary steering amount produced by the steering gear 4, and an auxiliary steering amount produced by the actutor 5.

The rear wheels 2 are connected with a rear wheel steering hydraulic actuator 6, so that the rear wheels 2 are steerable.

The front and rear hydraulic actuators 5 and 6 are connected with a hydraulic system, which includes a common hydraulic pressure source 7, a front hydraulic circuit 10, a rear hydraulic circuit 11 and a flow dividing valve 12. The common hydraulic pressure source 7 is a pressure source common to both of the front and rear actuators and common to both of the front and rear hydraulic circuits 10 and 11. The common pressure source of this embodiment includes an oil pump 7, which sucks in oil from a reservoir 8, and delivers the oil through a supply line 9 to the flow dividing valve 12. The flow dividing valve 12 divides the incoming fluid flow from the pressure source 7, between the front and rear hydraulic circuits 10 and 11.

The flow dividing valve 12 of this embodiment has a shuttle spool 12a which is resiliently held at a neutral position by first and second springs 12c and 12b. A first pressure chamber 12e is formed between a first end of the spool 12a and a casing of the valve 12. A second pressure chamber 12d is formed between a second end of the spool 12a and the valve casing. The first and second pressure chambers 12e and 12d are fluidly connected with the main supply line 9 through first and second orifices 12g and 12f, respectively. The first and second orifices 12g and 12f are different in diameter. That is, a fluid opening area of the first orifice 12g is not equal to that of the second orifice 12f. The first and second orifices 12g and 12f are both formed in the spool 12a. The spool 12a is further formed with first and second side holes 12i amd 12h. The casing of the valve 12 is formed with a single input port connected with the supply line 9 for receiving the incoming flow from the pressure source 7, and first and second output ports 12k and 12j. The first output port 12k is connected with the front hydraulic circuit 10. The second output port 12j is connected with the rear hydraulic circuit 11. The first pressure chamber 12e is in fluid communication with the front hydraulic circuit 10 via the first side hole 12i and the first output port 12k. The second pressure chamber 12d is in fluid communication with the rear hydraulic circuit 11 via the second side hole 12h and the second output port 12j. An opening formed between the first side hole 12i and the first output port 12k is increased and decreased when the spool 12a moves left and right in FIG. 1. Similarly, an opening between the second side hole 12h and the second output port 12j is varied in accordance with the displacement of the spool 12a. The spool 12a is moved in response to the fluid pressures in the first and second pressure chambers 12e and 12d. A similar flow dividing valve is shown in a U.S. Pat. No. 4,579,186.

A flow rate $Q_f$ required by the front hydraulic circuit 10 is expressed by $Q_f = A \cdot v$ where A is a pressure receiving area of a piston of the front actuator 5, and v is the time rate of change of position of the piston of the actuator 5. The speed v of the piston is given by $v = 2\pi \cdot f \cdot \delta$ where $\delta$(delta) is a stroke of the actuator 5, f is a frequency of the front wheel auxiliary steering. Therefore, $Q_f = A \cdot 2\pi \cdot f \cdot \delta$. A flow rate $Q_r$ required by the rear hydraulic circuit 11 is also determined in the same manner. A discharge rate $Q_o$ of the pump 7 is set equal to a sum of $Q_f$ and $Q_r$ ($Q_o = Q_f + Q_r$). The opening areas of the orifices 12g and 12f are determined to be corresponding to $Q_f/Q_o$ and $Q_r/Q_o$, respectively. In this way, the flow dividing valve 12 divides the discharge rate $Q_o$ of the pump 7 according to the ratio between the opening areas of the orifices 12g and 12f and supplies the flow rate $Q_f$ to the front circuit 10 and the flow rate $Q_r$ to the rear circuit 11.

If the flow rate supplied into the circuit 10 or 11 exceeds a predetermined flow rate, then the pressure drops in the pressure chamber 12e or 12d, and the spool 12a decreases the opening degree of the side hole 12i or 12h by moving rightwards or leftwards in FIG. 1 because of the pressure difference, so that the flow rate is decreased to the predetermined level. In this way, the flow dividing valve 12 holds substantially unchanged the ratio between the flow rate supplied to the circuit 10 and the flow rate supplied to the circuit 11. Therefore, the flow dividing valve 12 can prevent a pressure change in one of the circuits 10 and 11 from exerting influence on the other circuit.

A front wheel steer angle control valve 14 and a rear wheel steer angle control valve 15 are provided, respectively, in the front and rear hydraulic circuits 10 and 11. The control valves 14 and 15 are pressure control valves. The fluid pressure is supplied from the first output port 12k of the flow dividing valve 12 to the front actuator 5 through the front control valve 14. From the second output port 12j of the flow dividing valve 12, the fluid pressure is supplied through the rear control valve 15 to the rear actuator 6. A common drain circuit 13 connects each of the control valves 14 and 15 to the reservoir 8.

Each of the control valves 14 and 15 of this embodiment has a supply port connected with the output port 12k or 12j of the flow dividing valve 12, a drain port connected with the drain circuit 13, a left port connected with a left power chamber 5a or 6a of the actuator 5 or 6, and a right port connected with a right power chamber 5b or 6b of the actuator 5 or 6. Each control valve 14 or 15 further includes a left solenoid 14a or 15a and a right solenoid 14b or 15b. When both of the left and right solenoids 14a and 14b or 15a and 15b of each control valve 14 or 15 are off, then the control valve 14 or 15 is held at a neutral position shown in FIG. 1.

When the front control valve 14 is at its neutral position, all the four ports are connected together. That is, the front control valve 14 is an open center valve. Therefore, the whole quantity of the oil supplied from the flow dividing valve 12 into the supply port of the front control valve 14 is returned to the drain circuit 13 through the drain port, and the left and right power chambers 5a and 5b of the front actuator 5 are both held in a non-pressurized state. In this state, the front actuator 5 is held at a neutral position by left and right springs 5c and 5d disposed in the actuator 5, and holds the steering gear 4 at its neutral position. When the front actuator 5 and the steering gear 4 are at their respective neutral positions, the front wheel steer angle is determined only by the steering gear 4 in the conventional manner, and the front actuator 5 adds no auxiliary steer angle.

When the left solenoid 14a is energized, the front control valve 14 causes the front actuator 5 to expand by supplying the pressure to the left power chamber 5a and draining the right power chamber 5b. Therefore, the front actuator 5 moves the steering gear rightwards and steers the front wheels 1 leftwards in addition to the main steering operation of the conventional steering linkage. When the right solenoid 14b is energized, the front control valve 14 causes the front actuator 5 to contract by supplying the pressure to the right chamber 5b and draining the left chamber 5a, and accordingly the front actuator 5 adds an auxiliary steering quantity for steering the front wheels 1 rightwards, to the primary steering quantity of the conventional steering linkage by moving the steering gear 4 leftwards.

The rear control valve 15 and the rear actuator 6 are operated substantially in the same manner. The rear control valve 15 is also the open center type. When neither of the solenoids 15a and 15b are energized, the rear actuator 6 is held at a neutral position by left and right springs 6c and 6d, and holds the rear wheels 2 at a neutral, straight ahead, position. The rear wheels 2 are steered leftwards by energizing the left solenoid 15a, and steered rightwards by energizing the right solenoid 15b.

A controller 16 is electrically connected with the solenoids 14a, 14b, 15a and 15b of the control valves 14 and 15. In this embodiment, the controller 16 receives input signals from a steering angle sensor 17 for sensing a steering wheel angle $\theta$, and a vehicle speed sensor 18 for sensing a vehicle speed V. In accordance with these input signals, the controller 16 calculates a front wheel auxiliary steer angle and a rear wheel auxiliary steer angle. Various mathematical procedures for determining these steer angles are known. Some examples are disclosed in the above-mentioned U.S. Pat. Nos. 4,705,131 and 4,679,809. In the present invention, it is possible to employ any of the known procedures. The controller 16 controls the front and rear wheel steer angles so as to achieve the calculated auxiliary steer angles by controlling the energizing currents of the solenoids 14a, 14b, 15a and 15b, individually.

In this steering system, the flow dividing valve 12 renders each of the front and rear hydraulic circuits 10 and 11 free from influence of pressure variation in the other circuit in spite of the common possession of the single oil pump 17. This steering system, therefore, makes it possible to attain an accurate auxiliary steer angle control by using an open center type system, such as the system including the control valves 14 and 15 shown in FIG. 1, instead of a closed center system using servo valves. As a result, this steering system can eliminate a delay of response due to feedback control. Moreover this steering system is very advantageous in manufacturing cost because the control valves 14 and 15 of the type other than the servo type are inexpensive, and the auxiliary steer angle sensors are not required.

What is claimed is:

1. A steering system for a vehicle, comprising;
   a front hydraulic actuator for varying an actual front wheel steer angle of said vehicle,
   a rear hydraulic actuator for varying an actual rear wheel steer angle of said vehicle,
   controlling means for controlling said actual front and rear wheel steer angles by producing front and rear control signals,
   a front hydraulic circuit comprising a front control valve for varying a fluid pressure supplied to said front actuator in accordance with said front control signal,
   a rear hydraulic circuit comprising a rear control valve for varying a fluid pressure supplied to said rear actuator in accordance with said rear control signal,
   a common fluid pressure source, and
   a flow dividing valve having an input port connected with said common fluid pressure source, a first output port connected with said front hydraulic circuit, and a second output port connected with said rear hydraulic circuit,
   wherein each of said front and rear control valves is of an open center type, and said controlling mans includes means for determining a desired front and rear wheel auxiliary steer angles, producing said front control signal which is an electrical signal representing said desired front wheel auxiliary steer angle and said rear control signal which is an electrical signal representing said desired rear wheel auxiliary steer angle, and controlling said actual front and rear wheel steer angles by sending said front control signal to said front control valve through an open loop signal path having no summing point for feedback, and sending said rear control signal to said rear control valve through an open loop signal path having no summing point for feedback.

2. A steering system according to claim 1 wherein said flow dividing valve comprises means for dividing an incoming fluid flow supplied from said common fluid pressure source to said input port, into a first outgoing fluid flow delivered from said first output port to said front hydraulic circuit, and a second outgoing fluid flow delivered from said second output port to said rear hydraulic circuit so that a distribution ratio between said first and second outgoing flows is held substantially constant.

3. A steering system according to claim 2 wherein said distribution ratio is a ratio of a rate of said first outgoing flow to a rate of said second outgoing flow, and said distribution ratio is set equal to a ratio of a maximum speed of a piston of said front hydraulic actuator to a maximum speed of a piston of said rear hydraulic actuator.

4. A steering system according to claim 2 wherein each of said front and rear control valves is an open center valve which is normally held at a neutral position at which all ports are fluidly connected together.

5. A steering system according to claim 4 wherein said system further comprises draining means connected with said front and rear control valves, and each of said front and rear control valves comprises a supply port fluidly connected with said flow dividing valve for receiving one of said first and second outgoing flows, and a drain port connected with said draining means for drainage, and wherein said front control valve, when held at said neutral position, connects said supply port directly with said drain port and holds said front actuator at a neutral position at which a steering amount produced by said front actuator is equal to zero, and said rear control valve, when held at said neutral position, connects said supply port directly to said drain port and holds said rear actuator at a neutral position at which a steering amount produced by said rear actuator is equal to zero.

6. A steering system according to claim 5 wherein said flow dividing valve comprises a spool which is centered by spring means, and which separates first and second fluid pressure chambers so that said spool is movable in accordance with a difference between fluid pressures in said first and second pressure chambers, said spool being formed with a first orifice through which said first pressure chamber is in fluid communication with said input port, a second orifice through which said second pressure chamber is in fluid communication with said input port, a first side hole coupled with said first output port to form a first variable opening which is variable in accordance with a position of said spool, and a second side hole coupled with said second output port to form a second variable opening which is variable in accordance with the position of said spool.

7. A steering system according to claim 6 wherein said front control valve comprises a left port connected with a left power chamber of said front actuator, and a right port connected with a right power chamber of said front actuator, and said rear control valve comprises a left port connected with a left power chamber of said rear actuator, and a right port connected with a right power chamber of said rear actuator.

8. A steering system according to claim 7 wherein said steering system further comprises a steering wheel, and a steering linkage connecting said steering wheel with front wheels of said vehicle, and comprising a steering gear producing a steering amount substantially proportional to an angular displacement of said steering wheel, and said front actuator is connected with said steering linkage so that said front wheels are steered through an algebraic sum of said steering amount produced by said steering gear, and said steering amount produced by said front actuator.

9. A steering system according to claim 1, wherein each of said front and rear control valves is a solenoid operated valve.

* * * * *